United States Patent
Lin

(10) Patent No.: US 7,039,218 B2
(45) Date of Patent: May 2, 2006

(54) MOTION CORRECTION AND COMPENSATION FOR IMAGE SENSOR MOTION ESTIMATION

(75) Inventor: Chun-Huang Lin, Hsinchu (TW)

(73) Assignee: PixArt Imaging Inc., Hsin-Chu (TW)

( * ) Notice: Subject to any disclaimer, the term of this patent is extended or adjusted under 35 U.S.C. 154(b) by 694 days.

(21) Appl. No.: 10/302,014

(22) Filed: Nov. 22, 2002

(65) Prior Publication Data
US 2003/0202122 A1  Oct. 30, 2003

(30) Foreign Application Priority Data
Apr. 16, 2002 (TW) ................. 91107726 A

(51) Int. Cl.
*G06K 9/00* (2006.01)
(52) U.S. Cl. .................. 382/107; 348/155; 348/208.4
(58) Field of Classification Search ............ 348/154, 348/155, 208.4; 382/107
See application file for complete search history.

(56) References Cited

U.S. PATENT DOCUMENTS

| | | | |
|---|---|---|---|
| 5,323,334 A * | 6/1994 | Meyers et al. ............ 702/94 |
| 5,412,435 A * | 5/1995 | Nakajima ............... 348/699 |
| 6,108,032 A * | 8/2000 | Hoagland ............... 348/144 |
| 6,597,738 B1 * | 7/2003 | Park et al. ............ 375/240.16 |
| 6,628,805 B1 * | 9/2003 | Hansen et al. .......... 382/107 |
| 6,891,891 B1 * | 5/2005 | Pau et al. ............ 375/240.16 |
| 2003/0179940 A1 * | 9/2003 | Lin et al. ............... 382/233 |

* cited by examiner

*Primary Examiner*—Amir Ahmed
*Assistant Examiner*—Anand Bhatnagar
(74) *Attorney, Agent, or Firm*—Fish & Richardson P.C.

(57) ABSTRACT

A motion correction and compensation method for image sensors. A new flag and an old flag are used to detect the directions of movement and correct movements. A value of the new flag is set according to a direction of the present movement. A value of the old flag is set according to a previous movement. The values of the new flag and the old flag are compared to determine if the movement of a time is in the same direction as the movement of a previous time. The value of the old flag has a value for correcting the movement if movements at different time are in opposite direction. If movement is determined incorrect according to a reference image and a new image, previous movement is output and occurrences of incorrect movements are counted. If the occurrences do not exceed a maximum number, the next movement is predicted. If the next movement exceeds a maximum movement or the occurrences exceed a maximum number, the reference image is updated. If the next movement does not exceed a maximum movement, the reference image is holded.

4 Claims, 4 Drawing Sheets

| Time | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Movement | 0 | 1 | 1 | 1 | 0 | -1 | 0 | 0 | 1 | 1 | 0 | -1 | -1 | -1 | 0 | 1 | 0 |
| New flag | 1 | 1 | 1 | 1 | 1 | -1 | -1 | -1 | 1 | 1 | 1 | -1 | -1 | -1 | -1 | 1 | 1 |
| Old flag | 1 | 1 | 1 | 1 | 1 | -1 | -1 | -1 | 1 | 1 | 1 | -1 | -1 | -1 | -1 | 1 | 1 |
| Output Movement | 0 | 1 | 1 | 1 | 0 | 0 | 0 | 0 | 0 | 1 | 0 | 0 | -1 | -1 | 0 | 0 | 0 |

FIG. 3

MOTION CORRECTION AND COMPENSATION FOR IMAGE SENSOR MOTION ESTIMATION

Pursuant to 35 U.S.C. § 119(a)–(d), this application claims priority from Taiwanese application no. 091107726, filed on Apr. 16, 2002.

BACKGROUND OF THE INVENTION

1. Field of the Invention

The present invention relates to motion correction and compensation methods, and particularly to motion correction and compensation methods for image sensors.

2. Description of the Related Art

When an image sensor captures images, the images are affected by internal noise or external noise such that there are differences between the analog image data from different times. As the image sensor is composed of photonic sensor arrays, digitization of the analog data results in error. FIG. 1 shows a diagram for illustrating brightness of the images. As shown in FIG. 1, 10 represents the brightness of the images in a photonic sensor array at time 1, and the 20 represents the brightness of the images in a photonic sensor array at time 2. Since the movement of the images between time 1 and time 2 does not exceed a pixel, variations in the digital image data obviously result from internal or external noise, or the conversion of the analog image data to digital. These variations result in errors in image motion judgment. Moreover, the image sensor moves too fast to not evaluate the correlation between the images at different times correctly and determine wrong movement. For example, comparing the digital image data between time 1 and time 2, three possible movements are obtained by three different algorithms. (1) If the movement is determined the digital image data without slashes, the image sensor does not register movement. (2) If the movement is determined by the digital image data with slashes, with brightness of 3, 4, 4, 3 respectively, the image sensor register movement of one pixel to the right. (3) At time 1, there is digital image data of brightness 0. At time 2, there is no digital image data of brightness 0. If the movement is to be determined by digital image data of brightness 0, registration will fail. There is thus the present invention providing a method to correct the movement yielded by algorithm (2) and a method to compensate the movement yielded by algorithm (3).

SUMMARY OF THE INVENTION

It is therefore an object of the present invention to provide a motion correction and compensation method for image sensors.

To achieve the above object, the present invention provides a motion correction utilizing two flags, an old flag and a new flag, to detect directions of motion and correct movement errors.

The motion correction method in the present invention includes the following steps.

A new image and a reference image are captured by an image sensor. Correlation between the new image and the reference image is evaluated by motion estimation algorithm, by which the movement is.

A value of the new flag is set according to a direction of the movement. When the movement is 0, a value of the new flag is set to be a value of an old flag. When the movement is in one direction, the value of the new flag is set as 1. When the movement is in the other direction, the value of the new flag is set as −1.

The values of the new flag and the old flag are compared to determine if the movement at a given time is in the same direction as the movement at a previous time.

The movement at the time is output when it is in the same direction as the movement of the previous time.

The movement is added to a correction value when the movement at the time is not in the same direction as that of the previous time. The correction value is the value of the old flag.

The value of the old flag is set to be the value of the new flag.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 3 shows a diagram illustrating results of the motion correction in the present invention.

DETAILED DESCRIPTION OF THE INVENTION

The motion correction method disclosed by the invention utilizes the object's inertial to determine abrupt movement and correct.

The motion estimation method is such that an image is captured and stored as a reference image, another image is captured and stored as a new image, and correlations between the reference image and the new image are evaluated by some algorithm, such as block matching.

Figure 1:
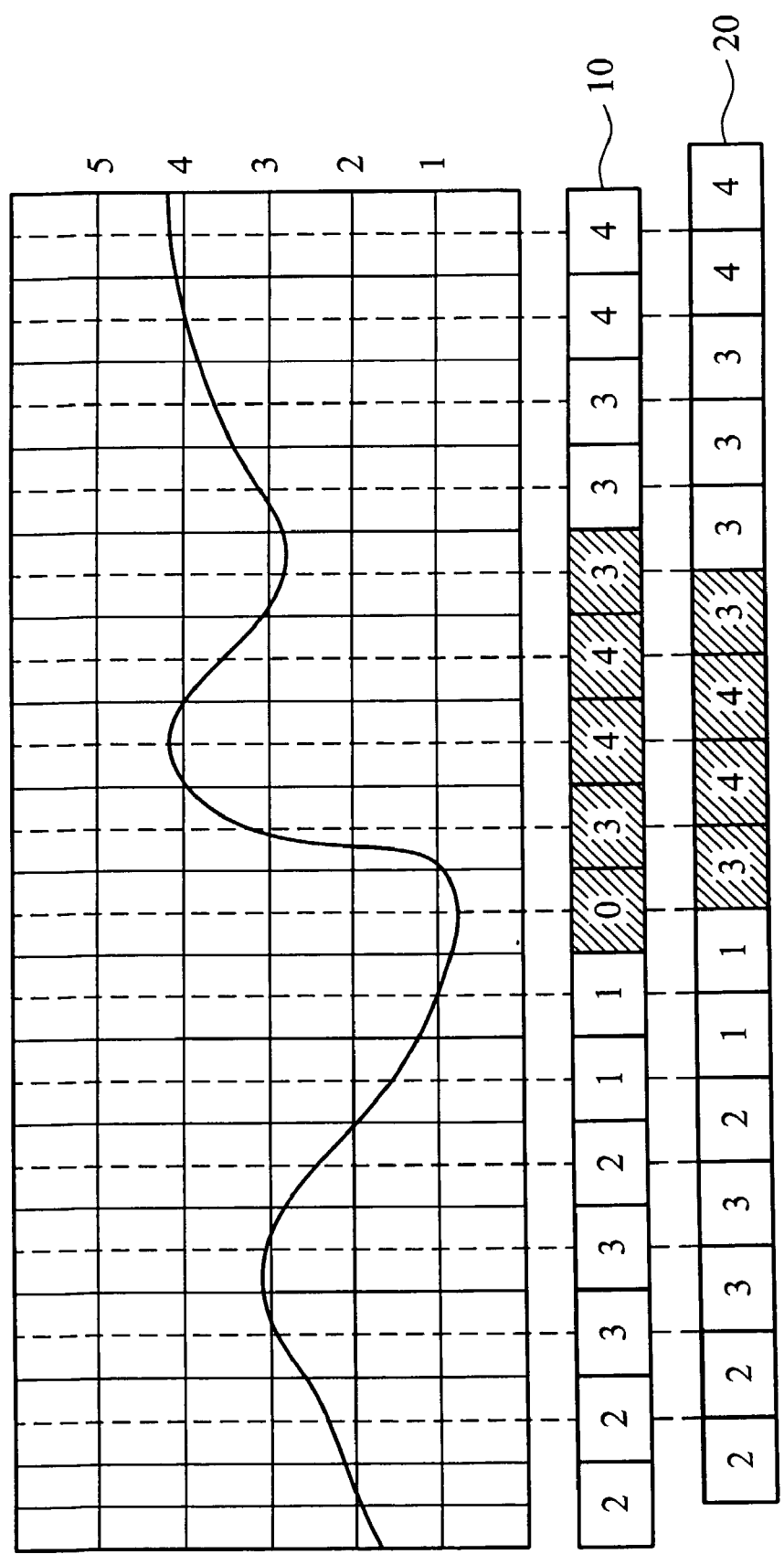
FIG. 1 shows a diagram for illustrating brightness of the images.
Figure 2:
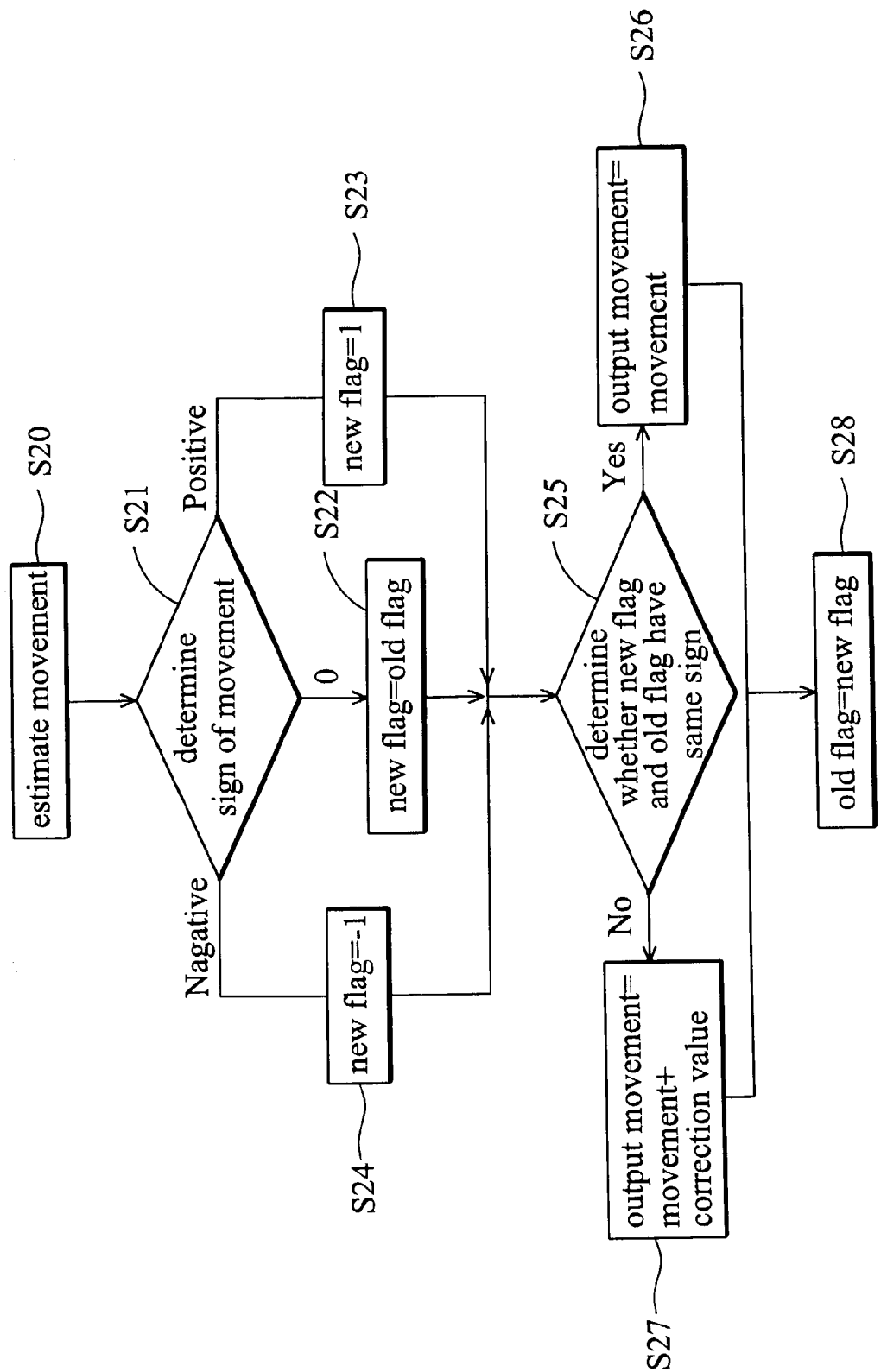
FIG. 2 shows a diagram for illustrating the flow chart of the motion correction method in the present invention.

A new flag and an old flag are used to determine abrupt errors in the present invention. FIG. 2 shows a diagram for illustrating the flow chart of the motion correction method in the present invention. At step S20, correlations are evaluated to determine movements. At step S21, a sign based on the direction of the motion is determined. For example, the sign is positive when the direction of the motion is positive. The sign is negative when the direction of the motion is negative. At step S22, if the movement is 0, a value of a new flag is set as the value of an old flag. At step S23, if the sign is positive, the new flag is set as 1. At step S24, if the sign is negative, the new flag is set as −1. At step S25, the new flag and the old flag are compared to determine if they have the same sign. At step S26, if the new flag and the old flag have the same sign, the output movement is equal to the movement. At step S27, if the new flag and the old flag are not the same sign, the output movement is equal to the movement added to the correction value. At step S28, the value of the old flag is set to be the value of the new flag.

FIG. 3 shows a diagram illustrating results of the motion correction in the present invention. At time 1, the movement is 0, the old flag is 1, the new flag is 1, and the output movement is 0. At time 2, the movement obtained by a motion estimation method is 1, the new flag is set to be 1, the new flag has the same sign as the old flag, the output movement is 1, and the value of the old flag is set to the value of the new flag. At time 3, the movement obtained by a motion estimation method is 1, the new flag is set as 1, the new flag has the same sign as the old flag, the output movement is 1, and the value of the old flag is set to the value of the new flag. At time 4, the movement obtained by a motion estimation method is 1, the new flag is set as 1, the new flag has the same sign as the old flag, the output movement is 1, and the value of the old flag is set to the value of the new flag. At time 5, the movement obtained by a motion estimation method is 0, the value of the new flag is set as the value of the old flag, 1, the new flag has the same sign with the old flag, the output movement is 0, and the value of the old flag is set to the value of the new flag. At time 6, since the movement obtained by a motion estimation method is −1, the new flag is set as −1, and since the new flag does not have the same sign with the old flag, the output movement is 0, the movement 1 added to the old flag −1, and the value of the old flag is set to the value of the new flag. At time 7, the movement obtained by a motion estimation method is 0, the value of the new flag is set as the value of the old flag, −1, the new flag has the same sign with the old flag, the output movement is 0, and the value of the old flag is set to the value of the new flag. At time 8, the movement obtained by a motion estimation method is 0, the value of the new flag is set as the value of the old flag, −1, the new flag has the same sign with the old flag, the output movement is 0, and the value of the old flag is set to the value of the new flag. At time 9, the movement obtained by a motion estimation method is 1, the new flag is set as 1, the new flag does not have the same sign with the old flag, the output movement is 0, the movement 1 added to the old flag −1, and the value of the old flag is set to the value of the new flag. At time 10, the movement obtained by a motion estimation method is 1, the new flag is set as 1, the new flag has the same sign with the old flag, the output movement is 1, and the value of the old flag is set to the value of the new flag. At time 11, the movement obtained by a motion estimation method is 0, the value of the new flag is set as the value of the old flag, −1, the new flag has the same sign with the old flag, the output movement is 0, and the value of the old flag is set to the value of the new flag. At time 12, the movement obtained by a motion estimation method is −1, the new flag is set as −1, the new flag does not have the same sign with the old flag, the output movement is 0, the movement 1 added to the old flag −1, and the value of the old flag is set to the value of the new flag. At time 13, the movement obtained by a motion estimation method is −1, the new flag is set as −1, the new flag has the same sign with the old flag, the output movement is −1, and the value of the old flag is set to the value of the new flag. At time 14, the movement obtained by a motion estimation method is −1, the new flag is set as −1, the new flag has the same sign with the old flag, the output movement is −1, and the value of the old flag is set to the value of the new flag. At time 15, the movement obtained by a motion estimation method is 0, the value of the new flag is set as the value of the old flag, −1, the new flag has the same sign with the old flag, the output movement is 0, and the value of the old flag is set to the value of the new flag. At time 16, the movement obtained by a motion estimation method is 1, the new flag is set as 1, the new flag does not have the same sign with the old flag, the output movement is 0, the movement 1 added to the old flag −1, and the value of the old flag is set to the value of the new flag. At time 17, the movement obtained by a motion estimation method is 0, the value of the new flag is set as the value of the old flag, 1, the new flag has the same sign with the old flag, the output movement is 0, and the value of the old flag is set to the value of the new flag.

The motion compensation method is particularly disclosed to overcome problems resulting from noise, or the image sensor moves too fast to determine correct movement.

Figure 4:
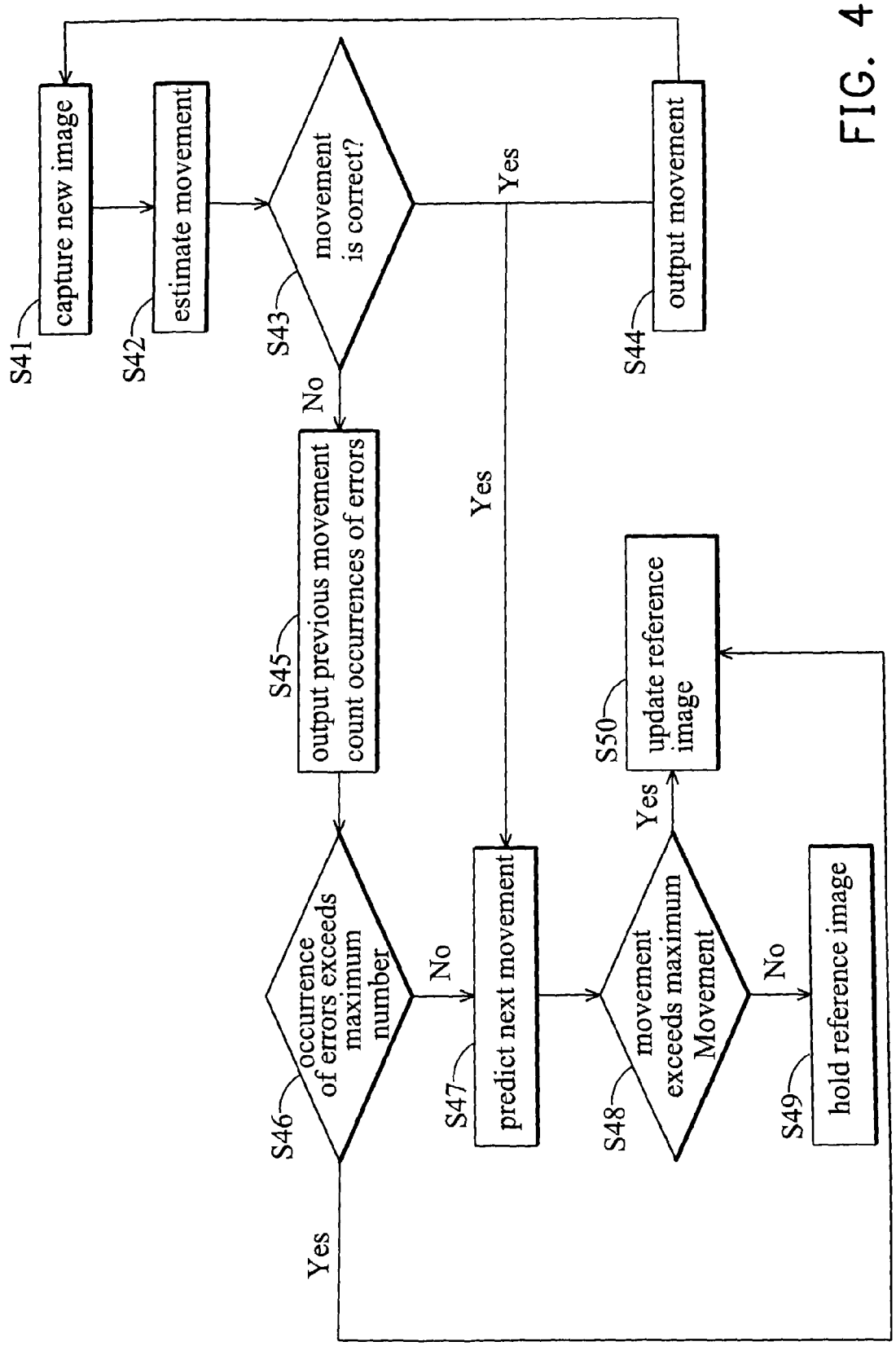
FIG. 4 shows a diagram for illustrating the flow chart of the motion compensation in the present invention.

FIG. 4 shows a diagram for illustrating the flow chart of the motion compensation in the present invention. At step S41, a new image is captured by the image sensor. At step S42, correlations between the new image and the reference image are evaluated by motion estimation algorithm, by which the movement is determined. At step S43, according to the correlations between the new image and the reference image, it is determined if the movement is correct. At step S44, when the movement is correct, the movement is output, and execution goes back to step S41. At step S45, when the movement is not correct, the previous correct movement is output, and an accumulated number of occurrences in which the movement is determined to not be correct is counted. At step S46, it is determined if the accumulated number exceeds a maximum number. At step S47, when the accumulated number does not exceed the maximum number, the next movement is predicted. At step S48, it is determined if the movement exceeds a maximum movement. At step S49, when the movement does not exceed the maximum movement, the reference image is held. At step S50, when the movement exceeds the maximum movement or the accumulated number exceeds the maximum number, i.e. the reference image does not overlap the new image, the reference image is updated. Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A motion correction method, which utilizes a reference image and a new image to determine a movement, comprising:
    setting a value of a new flag according to a direction of the movement wherein when the movement is 0, the value of the new flag is set as a value of an old flag;
    determining whether the movement at a given time is in the same direction as the movement of a previous time according to the values of the new flag and the old flag;
    outputting the movement of the time at which the movement is in the same direction as the movement of the previous time;
    outputting the movement added to a correction value when the movement of the time is not in the same direction as the movement of the previous time; and
    setting the value of the old flag as the value of the new flag.

2. The motion correction method as claimed in claim 1 wherein the step of setting the value of the new flag according to a direction of the movement comprises:
    setting the value of the new flag to be 1 when the direction of the movement is positive; and
    setting the value of the new flag to be −1 when the direction of the movement is negative;

3. The motion correction method as claimed in claim 1 wherein the correction value is the value of the old flag.

4. A motion compensation method comprising:
a. determining whether a movement of an image sensor is correct according to a reference image and a new image;
b. outputting the movement and executing step d when the movement is correct; outputting a previous correct movement and counting an accumulated number of occurrences in which the movement is not correct when the movement is not correct;
c. executing step e when the accumulated number exceeds a maximum number; otherwise executing step d;
d. predicting a next movement; executing step e when the next movement exceeds a maximum movement; otherwise preserving the reference image; and
e. updating the reference image.

* * * * *